(12) United States Patent
Nurmela et al.

(10) Patent No.: US 7,386,525 B2
(45) Date of Patent: Jun. 10, 2008

(54) DATA PACKET FILTERING

(75) Inventors: Kari Nurmela, Espoo (FI); Mika Rautila, Helsinki (FI)

(73) Assignee: Stonesoft Corporation (FI)

( * ) Notice: Subject to any disclaimer, the term of this patent is extended or adjusted under 35 U.S.C. 154(b) by 712 days.

(21) Appl. No.: 09/957,516

(22) Filed: Sep. 21, 2001

(65) Prior Publication Data

US 2003/0120622 A1    Jun. 26, 2003

(51) Int. Cl.
*G06F 17/00* (2006.01)

(52) U.S. Cl. .............................. 706/47; 726/3; 726/11; 726/13

(58) Field of Classification Search ................. 706/47; 726/3, 11, 13
See application file for complete search history.

(56) References Cited

U.S. PATENT DOCUMENTS

| | | | | |
|---|---|---|---|---|
| 5,210,748 | A * | 5/1993 | Onishi et al. | 370/405 |
| 5,606,668 | A * | 2/1997 | Shwed | 726/13 |
| 5,835,726 | A * | 11/1998 | Shwed et al. | 709/229 |
| 5,916,305 | A * | 6/1999 | Sikdar et al. | 709/236 |
| 5,951,651 | A * | 9/1999 | Lakshman et al. | 709/239 |
| 6,341,130 | B1 * | 1/2002 | Lakshman et al. | 370/389 |
| 6,628,653 | B1 * | 9/2003 | Salim | 370/389 |
| 6,658,002 | B1 * | 12/2003 | Ross et al. | 370/392 |
| 7,116,663 | B2 * | 10/2006 | Liao | 370/392 |

FOREIGN PATENT DOCUMENTS

EP    1006701    6/2000

OTHER PUBLICATIONS

"Pathfinder: A Pattern-Based Packet Classifier", Mary L. Bailey, Burra Gopal, Michael A. Pagels, Larry L. Peterson, Prasenjit Sarkar, Operating Systems Design and Implementation, 1994.*

* cited by examiner

*Primary Examiner*—David Vincent
*Assistant Examiner*—Mai T Tran
(74) *Attorney, Agent, or Firm*—Barnes & Thornburg LLP

(57) ABSTRACT

The invention relates to data packet filtering and finding a rule matching a data packet in a rule base. A data packet comprises parameter fields for identifying the data packet, the rule base comprises a plurality of rules, each rule comprises one or more parameter fields, and the matching rule is a rule, whose parameter field values correspond to the parameter field values of said data packet. The matching rule is found by determining rule sets for the data packet, one rule set comprising the rules to which one parameter field value of the data packet can match, and by finding the rule with the smallest label that is present in all said rule sets of the data packet, said rule with the smallest label indicating the rule matching the data packet. Additionally, the invention relates to finding an element with the smallest label that is present in a plurality of finite subsets containing finite number of elements, said subsets being subsets of a set containing finite number of sequentially labelled elements.

10 Claims, 5 Drawing Sheets

DATA PACKET FILTERING

BACKGROUND OF THE INVENTION

The invention relates in general to data packet filtering. In particular the invention relates to such a method as specified in the preamble of the independent claims.

Public networks are presently being used more and more for sensitive and mission critical communications and the internal networks of various organisations and enterprises are nowadays connected to the public networks, Internet being one of them. Since the basic mechanisms of the public networks were originally not designed with secrecy and confidentiality in mind, public networks are untrusted networks. To protect an internal network, a special network element is usually used to connect the internal network to a public network. This special network element is often called a security gateway or a firewall, and the purpose of a such network element is to prevent unauthorised access to the internal network. Typically there is need to restrict access to an internal network from a public network and/or to restrict access from the internal network to the public network or further networks connected to the public network. On data packet level this means that data packets, which are entering and/or exiting the internal network, are screened or filtered in a network element in order to determine whether the data packets are allowed to traverse the network element or not.

Data packet filtering may be needed for other purposes, too. For example, in intrusion detection systems (IDS) the traffic (data packets) flowing in a network is monitored and analysed. On the basis of the type of the data packet different kind of analysis may be conducted. Therefore, data packets need to be filtered in order to determine what kind of analysis is required.

FIG. 1 illustrates an example network topology with a first internal network 12, a second internal network 14 and a public network 10. The public network may be, for example, the Internet. The internal networks 12, 14 are connected to the public network 10 via network elements 16 and 18, respectively, the network elements 16 and 18 being firewalls or security gateways. Additionally, there is a network element 20 connected to the internal network 14. The network element 20 is an IDS node, which monitors the data packets entering and exiting the internal network 14. A network element 16, 18, 20 may be implemented as one network node or as a cluster of network nodes.

The term network element is used in this description for referring to any network element or to a cluster of any network elements, in which data packet filtering is performed. A network element may be, for example, a firewall node, a firewall node provided with Virtual Private Network (VPN) functionality, a network monitoring node, an IDS node.

The data packet filtering is usually done by means of a rule base comprising a set of rules. Each rule comprises certain parameters of data packets (e.g. source address, destination address and protocol) and an action (i.e. information about how to handle the data packet corresponding to the parameters of the rule). In a firewall, the action is typically 'drop' or 'accept', which means the data packet is discarded or allowed to proceed, correspondingly. Such a set of rules is usually sequentially ordered and each received data packet is compared with the rules linearly, one by one, until a match is found. The first rule, whose parameters match the parameters of the received data packet, is applied to the data packet and the data packet is handled as indicated by the rule. Sometimes the action of the rule can be "continue", which means that further matching rules need to be inspected to find out how the packet shall be handled. The action may also be instructions to run some script, when a data packet matches the rule. A data packet, whose parameters do not match any rule, may be for example discarded. FIG. 2 illustrates as an example a rule base, having a first rule Rule1, a second rule Rule2, and so forth. Each rule has two parameter fields, field1 and field2, and an action field. In many practical applications, there are more than two parameter fields, though.

Considering the performance of the network element it is important that the matching of the data packets to the rule base is done as efficiently as possible. Especially, if the rule base is large, the performance of the network element depends on the matching speed. In many cases, appropriate functionality of the network element requires a large rule base. Additionally, it may be required to translate some user defined higher level rules to lower level rules before matching can take place (e.g. a collection of of 20 IP-addresses defined in one higher level rule may need to be translated to 20 separate lower level rules). Furthermore, a packet is often compared to large number of rules before the rule to which it matches is found. In the worst case, a packet is compared to all rules in the rule base and then discarded or the packet matches the very last rule. This results in inefficient use of processing resources in the network element, if linear matching is used.

In European patent application EP 1 006 701 A2, "Adaptive re-ordering of data packet filter rules", by Krishnan P, Raz D and Sugla B, a method for re-ordering filter rules is presented for improving the matching process. The rules are re-ordered so that a rule that most frequently matching rules are arranged to be as close to the beginning of the rule base as possible. The disadvantage in this solution is that in order to maintain the correct functionality of the rule base changing the order of the rules is limited. Additionally, if the data packets to be handled are not homogenous, the proposed solution does not improve the matching process, since the re-ordering is based on the history of processed data packets.

Thus, a more efficient method for data packet filtering is required, especially in connection with large rule bases.

SUMMARY OF THE INVENTION

An object of the invention is to avoid or alleviate the above mentioned disadvantages. The object is achieved with a new method, network element and computer program product for finding, in a rule base, a rule matching a data packet and for finding an element with the smallest label that is present in a plurality of finite subsets of a set containing finite number of sequentially labelled elements, which are suitable for use in data packet filtering.

The objects of the invention are achieved according to the invention as disclosed in the attached independent claims. Preferred embodiments of the invention are disclosed in the dependent claims. The features described in one dependent claim may be further combined with features described in another dependent claim to produce further embodiments of the invention.

According to a first aspect of the invention there is provided a method for finding, in a rule base, a rule matching a data packet, a data packet comprising parameter fields for identifying the data packet, the rule base comprising a plurality of sequentially labelled rules, each rule comprising one or more parameter fields, and a rule matching a data packet being a rule, whose parameter field values correspond to the parameter field values of said data packet, and the method comprising the steps of:

determining rule sets for the data packet, one rule set comprising the rules to which one parameter field value of the data packet can match, and finding the rule with the smallest label that is present in all said rule sets of the data packet, said rule with the smallest label indicating the rule matching the data packet.

According to a second aspect of the invention there is provided a method for finding, in a rule base, a rule matching a data packet, a data packet comprising parameter fields for identifying the data packet, the rule base comprising a plurality of sequentially labelled rules, each rule comprising one or more parameter fields, and a rule matching a data packet being a rule, whose parameter field values correspond to the parameter field values of said data packet, and the method comprising the steps of:

computing, for each parameter field in the rule base, a data structure indicating different values or value ranges of the parameter field and, for each different value or value range, a rule set of the rules, to which said value or value range can match, storing said data structures, finding, in said data structures, rule sets for the data packet, said rule sets being the rule sets corresponding to the parameter field values of the data packet, and finding the rule with the smallest label that is present in all said rule sets of the data packet, said rule with the smallest label indicating the rule matching the data packet.

According to a third aspect of the invention there is provided a method for finding, in a rule base, a rule matching a data packet, a data packet comprising parameter fields for identifying the data packet, the rule base comprising a plurality of sequentially labelled rules, each rule comprising one or more parameter fields, and a rule matching a data packet being a rule, whose parameter field values correspond to the parameter field values of said data packet, and the method comprising the steps of:

determining rule sets for the data packet, one rule set comprising the rules to which one parameter field value of the data packet can match, computing a table for the combination of the rule sets of the data packet, the rows of the table corresponding to the labels of the rules in the rule base, and the columns of the table corresponding to the different rule sets, and the cells of the table being filled so that each cell contains an element, which is the smallest possible label of a rule of the respective rule set and equal to or larger than the label of the respective row, observing a first element in a first row of a first column and comparing the first element to the respective row label, if the element is equal to the row label, jumping to another column in the same row and observing a second element found therein, or otherwise jumping to the row indicated by the first element and observing a second element found in a column therein, and proceeding on the basis of the second element and the respective row label in the same way as with the first element, and repeating the steps of observing, comparing and jumping until a row containing equal elements in all columns or the last row of the table is found (614), the label of said row or said equal element indicating the rule matching the data packet.

According to a fourth aspect of the invention there is provided a method for finding an element with the smallest label that is present in a plurality of finite subsets containing finite number of elements, said subsets being subsets of a set containing finite number of sequentially labelled elements, said method comprising the steps of:

computing a table for the plurality of finite subsets, the rows of the table corresponding to the labels of the elements of the set, and the columns of the table corresponding to the different subsets, and the cells of the table being filled so that each cell contains an element, which is the smallest possible label of an element of the respective subset and equal to or larger than the label of the respective row, observing a first element in a first row of a first column and comparing the first element to the respective row label, if the element is equal to the row label, jumping to another column in the same row and observing a second element found therein, or otherwise jumping to the row indicated by the first element and observing a second element found in a column therein, and proceeding on the basis of the second element and the respective row label in the same way as with the first element, and repeating the steps of observing, comparing and jumping until a row containing equal elements in all columns or the last row of the table is found, the label of said row indicating the element with the smallest label that is present in the plurality of subsets.

According to a fifth aspect of the invention there is provided a method for finding, in a rule base, a rule matching a data packet, a data packet comprising parameter fields for identifying the data packet, the rule base comprising a plurality of sequentially labelled rules, each rule comprising one or more parameter fields, and a rule matching a data packet being a rule, whose parameter field values correspond to the parameter field values of said data packet, and the method comprising the steps of:

determining rule sets for the data packet, one rule set comprising the rules to which one parameter field value of the data packet can match, computing low level bit sequences for the data packet, each low level bit sequence corresponding to one rule set in the combination of the rule sets of the data packet, each bit of a low level bit sequence corresponding to one rule in the rule base, and a bit in a low level bit sequence being set to 0, if the corresponding rule is not present in the corresponding rule set, and a bit in a low level bit sequence being set to 1, if the corresponding rule is present in the corresponding rule set, computing bitwise AND for said low level bit sequences of the data packet for obtaining low level result sequence, and finding, in said low level result sequence, the first 1 starting from the beginning of the low level result sequence, the position of said first 1 in the low level result sequence indicating the rule matching the data packet.

The methods according to the invention optimize the rule base traversal in a firewall (or similar network element) so that the performance of the firewall improves especially with very large rule bases. The method is fast because the rules are not matched linearly; the method can directly skip a number of successive rules whenever they cannot match to a parameter field value in the data packet. Furthermore, there is no need to translate the high level rules into low level rules, which is important, if there are complex expressions defining the sets in the rules.

These and other features of the invention, as well as the advantages offered thereby, are described hereinafter with reference to embodiments illustrated in the accompanying drawings.

DETAILED DESCRIPTION OF THE INVENTION

Figure 1:
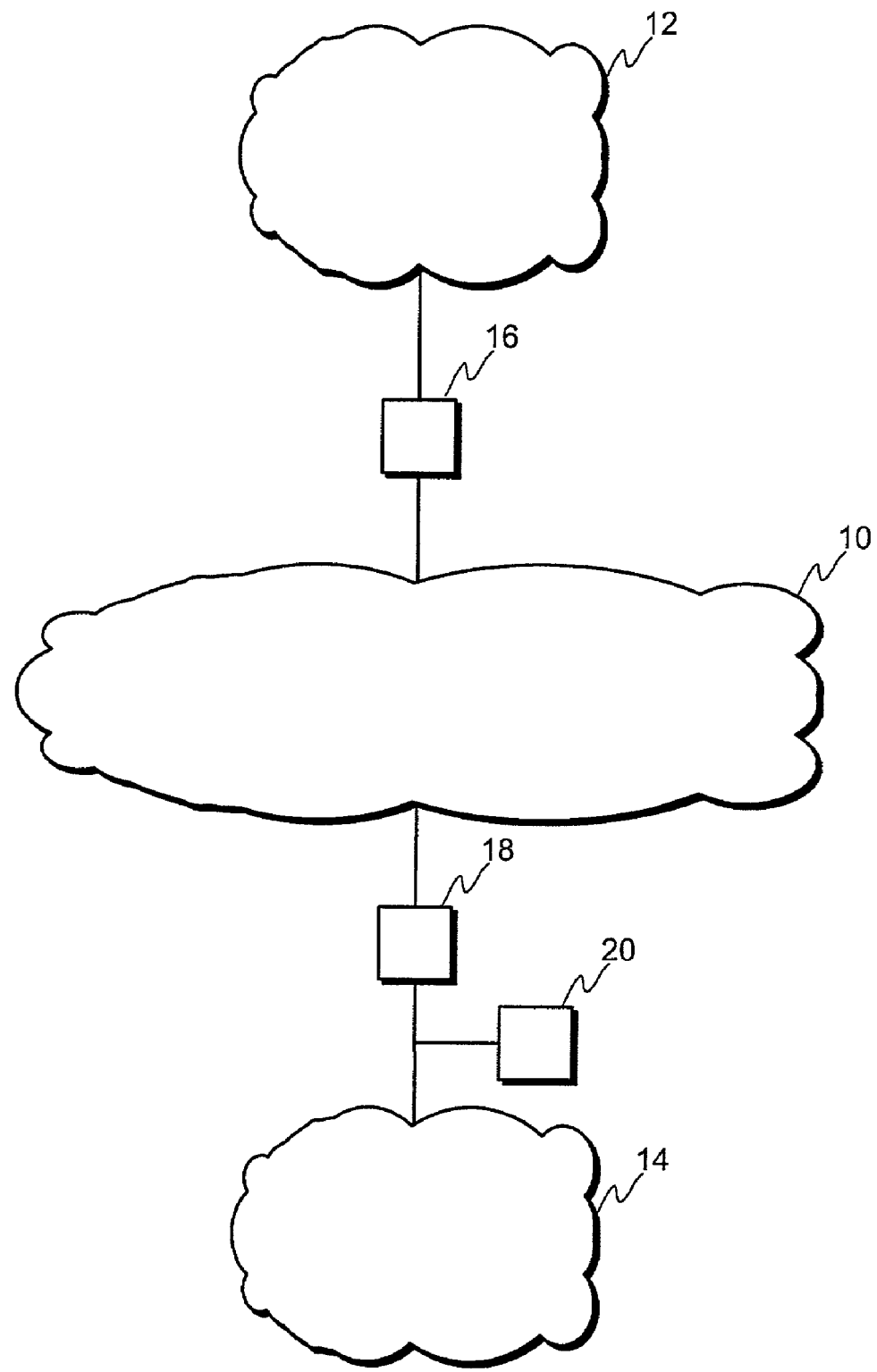
FIG. 1 illustrates an example network topology.
Figure 2:
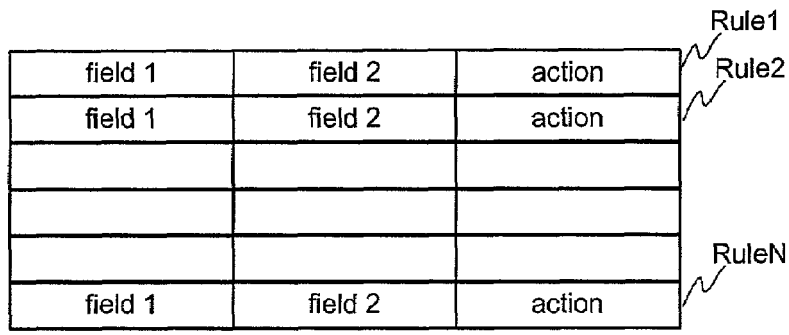
FIG. 2 illustrates an example rule base.

FIGS. 1 and 2 are discussed in more detail above in connection with the prior art description.

The invention is described herein in connection with data packet filtering and therein in connection with finding, in a rule base, a rule matching a data packet. Nevertheless, it must be appreciated that it is possible to employ the methods according to the invention also in connection with any other suitable application. For example, the invention provides a method for finding an element with the smallest label that is present in a plurality of finite subsets of a set containing finite number of sequentially labelled elements. One example of such subsets and sets are rule sets according to some aspects of the invention and rule bases of firewalls or similar network elements, but the set may be also some other sequentially ordered set of elements.

As discussed in connection with prior art data packet filtering involves finding, in a rule base, a (first) rule matching the data packet. A data packet comprises parameter fields for identifying the data packet, the rule base comprises a plurality of sequentially labelled (e.g. numbered) rules, each rule comprises one or more parameter fields, and a matching rule is a rule, whose all parameter field values correspond to the parameter field values of said data packet. In a rule base, there may be several rules matching one data packet and the matching rule with the smallest label is the rule that is first applied in connection with the data packet. Depending on the rule, one or more further matching rules may also be needed. Most commonly, there are more than one parameter fields in a rule, but also one-field option is possible. In case of one-field option, the invention is beneficial, if the values in the parameter field of the rules are complex expressions and therefore would need to be translated into low-level rules in order to enable simple linear matching.

In the following description the term smallest element is used for indicating the rule with the smallest label or, more generally, for indicating the element with the smallest label within a certain set of elements.

Figure 3:
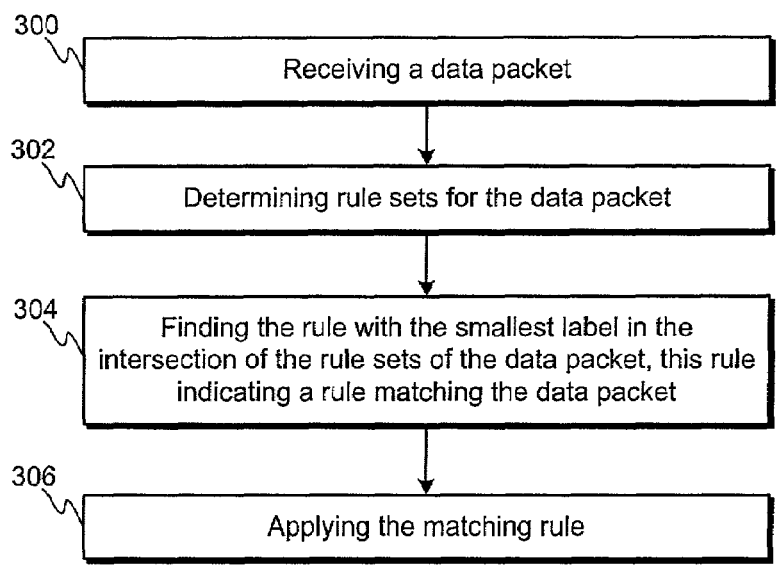
FIG. 3 illustrates as an example a flowchart of a method in which a method according to the first aspect of the invention is used.

FIG. 3 illustrates as an example a flowchart of a method of data packet filtering in which a method according to the first aspect of the invention is used. In step 300, a data packet to be filtered is received. Then, in step 302, rule sets for the data packet are determined. Each rule set relates to at least one parameter field value of the data packet and comprises the rules to which said parameter field value can match, that is, the rules which contain said parameter field value. In step 304, the rule with the smallest label that is present in all said rule sets relating to the data packet is found and said smallest element indicates the first matching rule. In step 306, the matching rule is applied, that is, the action indicated by the rule is performed.

The action of a rule may be instructions for handling the data packet, e.g. deny or allow the packet to proceed. The action may also indicate a script to be run. Alternatively, the action may indicate that a further matching rule needs to be found. Searching for a further matching rule may start from the rule after the previous match (for example a CONTINUE action in firewalls), or from a given rule (for example a JUMP action in firewalls). It must be noted, that when a further match (or further matches) need to be found, the same rule sets can be used again. That is, the rule sets do not need to be searched for again. The method for finding a further matching rule for a data packet is for example the following: after finding the smallest element in the intersection of the rule sets relating to the data packet, the rules following said smallest element in a rule set form a remainder of the rule set and the further matching rule is indicated by the further smallest element that is present in said remainders of all rule sets of the data packet. This procedure may be repeated as many times as needed. The remainders of the rule sets (the first rule of the remainders) may be defined also by the action of the first (or previous) matching rule. For example, a JUMP action in firewalls defines the rule to which to jump, that is, the rule indicated by the action and the rules following that rule form the remainders of the rule sets.

Figure 4:
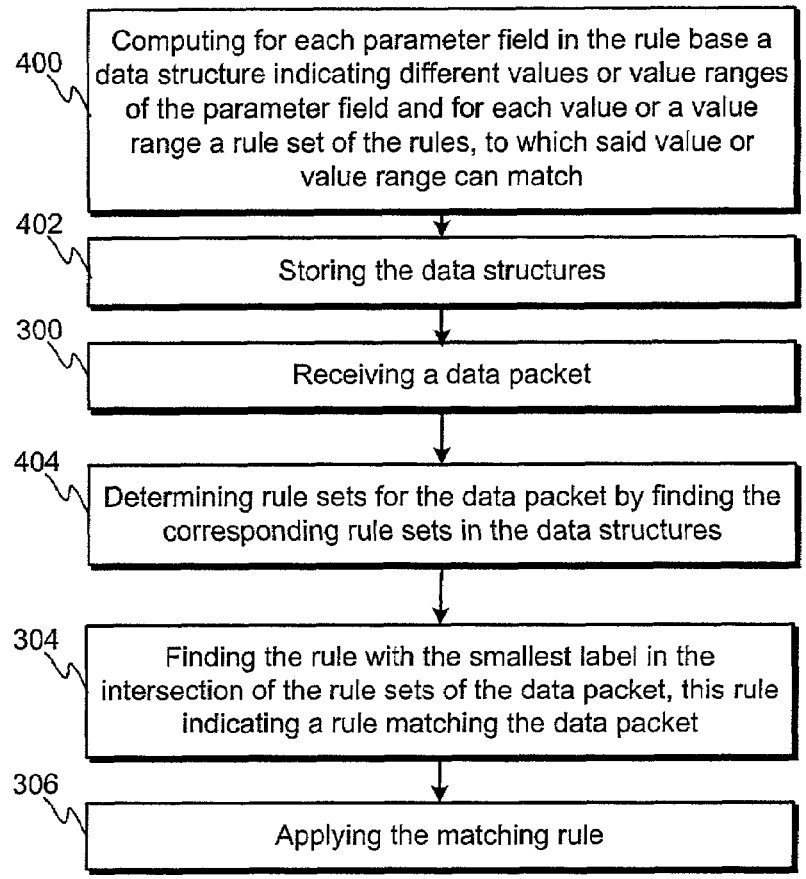
FIG. 4 illustrates as an example a flowchart of a method in which a method according to the second aspect of the invention is used.

FIG. 4 illustrates as an example a flowchart of a method in which a method according to the second aspect of the invention is used. Now, certain rule sets are computed and stored before matching a data packet to the rule base. In step 400, for each parameter field in the rule base, a data structure indicating different values or value ranges of the parameter field and, for each different value or value range, a rule set of the rules, to which said value or value range can match, is computed and resulting data structures are stored in step 402. These data structures can be computed solely on the basis of the rule base. The value ranges are defined so that for all elements in one value range, the elements can match exactly the same rules. The details of how the different values or value ranges can be defined are given later in this document.

More specifically, computing the rule sets may be done so that, for a parameter field, a rule set for each value or value range defined in the rules of the rule base, is computed. In addition, a further rule set for the values of said parameter field, which are not included in the values or value ranges defined in the rules of the rule base, is computed. Such further rule set represents all other values for the parameter field than those identified in the rules. For example, such rule set corresponds to an ANY rule in a firewall.

Then, a data packet is received in step 300, the same way as in connection with FIG. 3. In step 404, the rule sets relating to the data packet are determined by finding the rule sets corresponding to the parameter field values of the data packet in the data structures computed in step 400. That is, when a data packet is matched, for each parameter field value of the data packet, it is possible to efficiently find in the data structures the (pointer to the) subset of rules (rule set) that the data packet can match, based on this individual parameter field value. After this, the method proceeds as in connection with FIG. 3. In steps 304 and 306, the smallest element that is present in all said rule sets relating to the data packet is found and the matching rule is applied.

Figure 5:
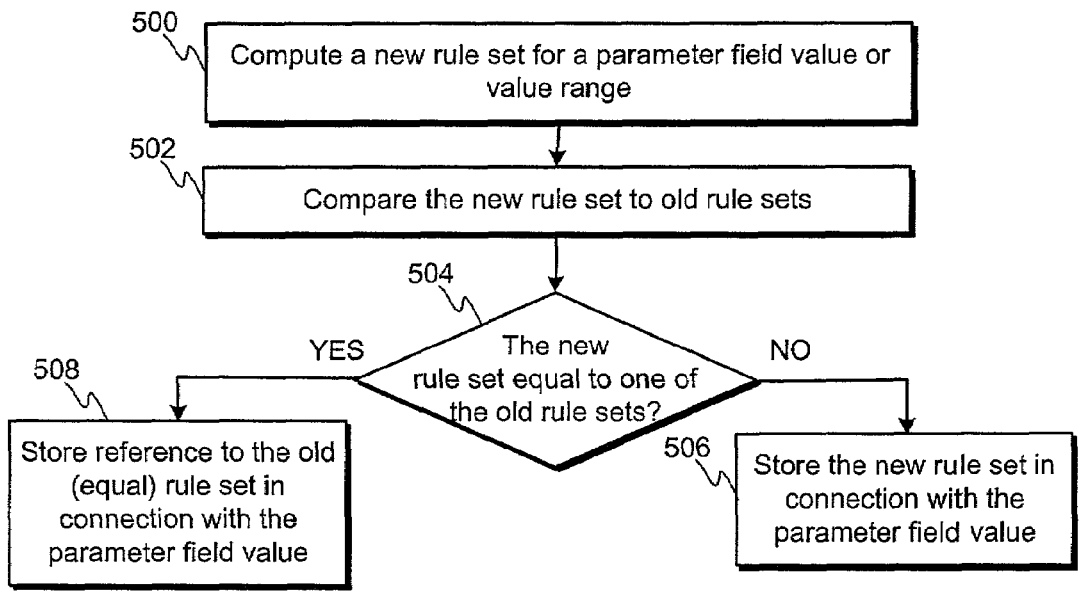
FIG. 5 illustrates as an example a flowchart of a method according to the invention for storing the rule sets.

FIG. 5 illustrates as an example a flowchart of a method according to the invention for storing the rule sets. It is common that there will be a number of identical rule sets relating to one rule base. These can be shared in order to save memory. One possible implementation for storing the rule sets when identical rule sets are shared is presented herein. In step 500, a new rule set relating to a parameter field value or value range of a rule base is computed. This new rule set is then compared to old rule sets in step 502 and in step 504, it is checked if the new rule set is equal to some old rule set. If the answer is no, the new rule set is stored in a data structure in connection with the parameter field value (i.e. this is a first occurrence of said rule set) in step 506. If the answer is yes, a reference to the old, equal rule set is stored in connection with the parameter field value in step 508. For comparing the rule sets, it is possible to compute and store a hash value of a new rule set, when computing the new rule set, and compare the hash value of the new rule set to the hash values of the previously computed rule sets. If rule sets with identical hash values are found, the actual rule sets are compared. In this way, comparing new rule sets to the old rule sets is faster.

It is possible to implement finding the rule with the smallest label that is present in all rule sets of a data packet, i.e. the smallest element in intersection of said rule sets, in any suitable way. A trivial algorithm for this is to linearly check the rule sets relating to the data packet. That is, starting from the beginning of the rule base (from the rule with the smallest label, that is from the smallest element in the rule base) it is checked one-by-one whether the element is present in all rule sets.

The aspects of the invention described below provide novel methods for finding the smallest element.

Figure 6A:
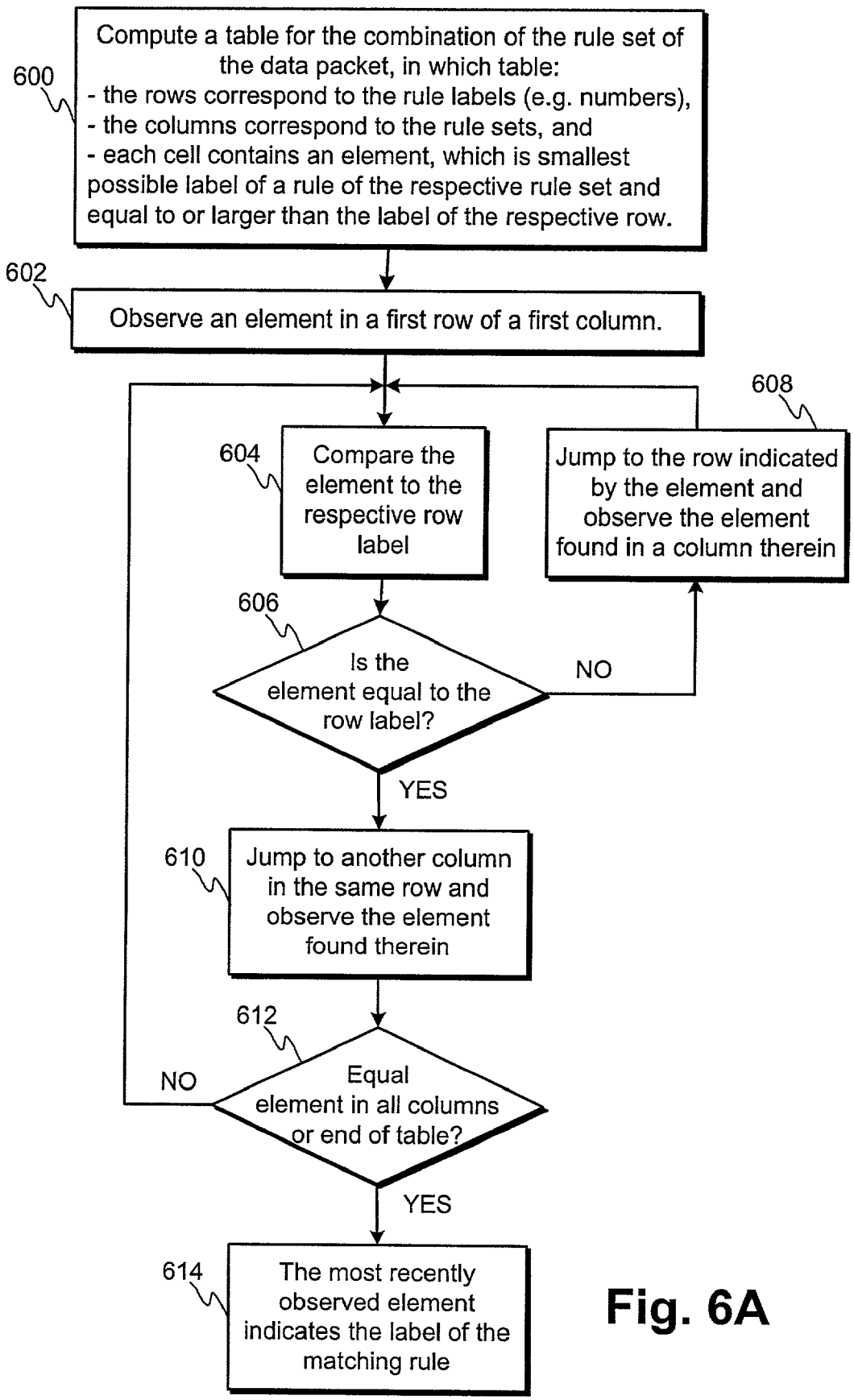
FIG. 6A illustrates as an example a flowchart of a method according to the invention for finding the rule with the smallest label in the intersection of the rule sets.

According to a third aspect of the invention the rule sets for a data packet are first determined. Then, a table for the combination of the rule sets of the data packet is computed, the rows of the table corresponding to the labels (e.g. numbers) of the rules in the rule base, and the columns of the table corresponding to the different rule sets, and the cells of the table are filled so that each cell contains an element, which is a rule with the smallest possible label in the respective rule set and equal to or larger than the label (e.g. number) of the respective row. FIG. 6A illustrates as an example a flowchart of the method according to the third aspect of the invention for finding the smallest element in the intersection of the rule sets. In step 600, the table is computed for the combination of the rule sets of the data packet.

In steps 602 and 604, an element in a first row of a first column is observed and compared to the respective row label (that is, to the label of the row the element resides in). It is checked, whether the element is equal to the row label, in step 606. If the answer is no, the procedure jumps to the row indicated by the previously observed element and the element found in the column therein is observed, in step 608. It is possible that the procedure jumps to said row in the same column or in some other column of the table. In most implementations it is not necessary to jump to the same column, since the element in the same column is implicitly known by the previously observed element. The some other column may be the next column or there may be some complex algorithm for finding the optimal column to jump to. Then this newly observed element is compared to the respective row label and it is checked if the element is equal to the row label, in steps 604 and 606, and so forth.

If the element is equal to the row label, the procedure jumps to another column in the same row and the element found therein is observed in step 610. In step 612, it is checked if equal element has been observed in all columns of the table or if the last row (the end) of the table has been reached. If the answer is no, the procedure proceeds on the basis of the element observed in step 610 by comparing the element to the respective row label and checking if the element is equal to the row label in steps 604 and 606, respectively. If the answer is yes, the most recently observed element (that is, the element observed in step 610) or the label of the row the most recently observed element resides in indicates the smallest element in step 614. In other words, the observing, comparing and jumping are repeated until a row containing equal elements in all columns or the last row of the table is found.

It is possible to compute and store above described tables beforehand for different combinations of rule sets, but this may require too much memory in most practical applications. Another possibility is to compute one table containing all possible rule sets and pick up the columns relevant for a certain data packet from that table when the data packet is matched.

Considering performance measures, this approach trades some memory to time. The worst-case time complexity of this algorithm is the same as with the trivial linear algorithm, but in practise this algorithm usually only checks a fraction of the elements checked by the trivial algorithm, thus finding the smallest element faster.

According to the fourth aspect of the invention, the method for finding the smallest element according to the third aspect of the invention described above in connection with a rule matching application, is used in general purpose for finding the smallest element in the intersection of a plurality of subsets of a set of sequentially ordered set of elements. Herein, being a subset of a set means that the elements of a subset are included in the set, but there is no other limitation to which elements of the set form a particular subset. However, the order of the elements in the set is maintained in the subsets as well.

Yet another method for implementing the mechanism for finding the smallest element provided by the fifth aspect of the invention is the following: For each rule set of a data packet, a bit sequence is stored. The bit number i is equal to 1, if the element (rule number) i is present in the corresponding rule set, and 0 otherwise. Then, a bitwise AND operation for the n first bits of the bit sequences is performed. If the result is equal to 0 (all zero bit sequence), we do the bitwise AND for the next n bits, and so on, until the result is other than 0. Finding the first 1-bit in the result now indicates the first matching rule.

This method requires less memory than the method according to the third and fourth aspects of the invention, and with current computer hardware the bitwise AND operation can be done for, e.g., 128 bits in parallel. While this method in its basic form cannot jump over more than n rules at once, it can be very fast with practical rule bases and current computer implementations.

Figure 6B:
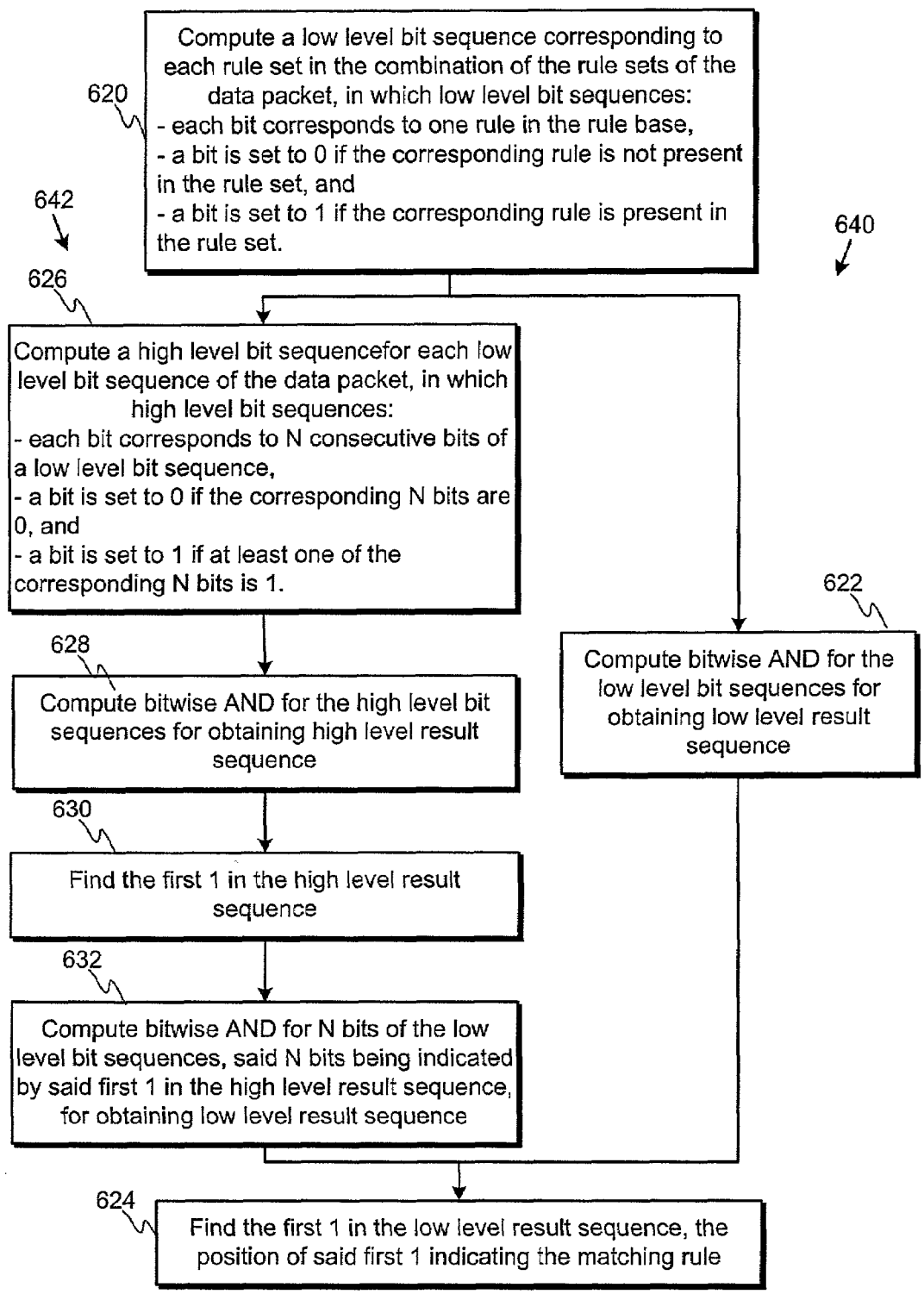
FIG. 6B illustrates as an example a flowchart of another method according to the invention for finding the rule with the smallest label in the intersection of the rule sets.

This method according to the fifth aspect of the invention is further illustrated as an example in FIG. 6B. First, the rule sets for a data packet are determined. In step 620, low level bit sequences for the data packet are computed. Each low level bit sequence corresponds to one rule set in the combination of the rule sets of the data packet. Each bit of a low—level bit sequence corresponds to one rule in the rule base. For example, the sequence number of a bit in the low level bit sequence corresponds to the number of the rule. As stated above, a bit in a low-level bit sequence is set to 0, if the corresponding rule is not present in the corresponding rule set, and to 1, if the corresponding rule is present in the corresponding rule set. In other words, the bit number i is equal to 1, if the element (rule number) i is present in the corresponding rule set, and 0 otherwise.

There are illustrated two options for performing the method. The first one illustrated in branch 640, is to compute, in step 622, bitwise AND for the low level bit sequences relating to the data packet for obtaining low level result sequence, and to find, in step 624, in said low level result sequence, the first 1 starting from the beginning of the low level result sequence. The position of said first 1 indicates the smallest element and thus the matching rule. That is, starting from the smallest sequence number of the low level result sequence the first 1 is searched for.

The bitwise AND operation may be implemented for example in the following way: Perform a bitwise AND operation for the n first bits of the low level bit sequences. If the result is equal to 0 (all zero bit sequence), do the bitwise AND for the next n bits of the low level bit sequences, and so on, until the result is other than 0. Finding the first 1-bit in the result now indicates the first matching rule. This method needs less memory than the the method illustrated in FIG. 6A, and with current computer hardware the bitwise AND operation can be done, for example, for 128 bits in parallel. While this method in its basic form cannot jump over more than n non-matching rules at once, it can be very fast with practical rule bases and current computer implementations.

Another option for the branch 640 is illustrated in branch 642. This option is especially suitable, if the low level bit sequences have only very few 1's, and the rule base is very large. The idea is to compute high level bit sequences on the basis of the low level bit sequences in step 626. Each bit of a high level bit sequence corresponds to N consecutive bits of a low level bit sequence. A bit in a high level bit sequence is set to 0, if the corresponding N bits in the low level bit sequence are 0, and to 1, if at least one of the corresponding N bits in the low level bit sequence is 1. In step 628, bitwise AND is computed for said high level bit sequences for obtaining a high level result sequence, and the first 1 in the high level result sequence is found in step 630. The bitwise AND operation with the high level bit sequences gives approximate locations of the possibly matching rules in the low level bit sequences. In step 632, bitwise AND is computed for N bits of the low level bit sequences, said N bits being indicated by said first 1 in the high level result sequence, for obtaining low Level result sequence. That is, bitwise AND is done for the approximate locations obtained by the high level result sequence. After this, the first 1 starting from the beginning of the low level result sequence is found in step 624, and the position of said first 1 indicates the smallest element and thus the matching rule.

Also some other method for implementing the mechanism for finding the smallest element may be suitable in connection with the invention.

According to the invention, the methods discussed above may be combined together in any suitable way and the details of the methods may vary from those presented above. Furthermore, the order of the steps in the flowcharts presented is not meant to be restrictive.

Figure 7:
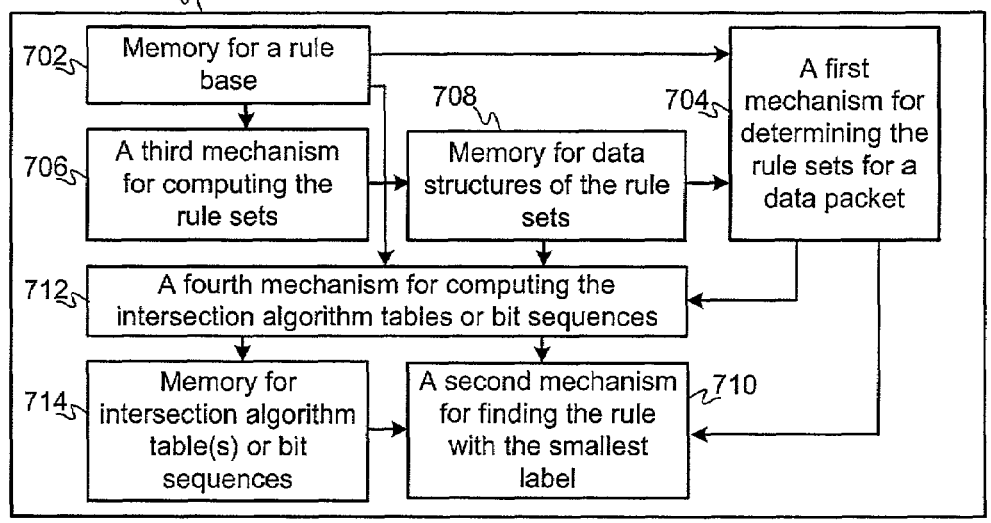
FIG. 7 illustrates an example block diagram of a network element according to the invention.

The invention may be implemented as a suitable combination of hardware and software. Typically the implementation is software program code executed in a processor unit combined with suitable memory resources. FIG. 7 illustrates an example block diagram of a network element 700 according to the invention.

The network element comprises memory 702 for storing a rule base, memory 708 for storing data structures of the rule sets, and memory 714 for storing intersection algorithm table(s) or bit sequences. Furthermore, the network element comprises a first mechanism 704 for determining rule sets relating to the data packet, a second mechanism 710 for finding the smallest element, a third mechanism 706 for computing rule sets relating to parameter field values of a rule base, and a fourth mechanism 712 for computing the intersection algorithm tables discussed above in connection with FIG. 6A or the bit sequences discussed in connection with the FIG. 6B. Additionally, the network element includes a mechanism for receiving data packets and a mechanism for applying the matching rule, but these are not shown in the Figure.

The third mechanism 706 computes the rule sets solely on the basis of the rule base and stores the resulting rule sets in data structures in memory 708. The first mechanism 704 determines the rule sets relating to a data packet on the basis of the parameter fields of the data packet and on the basis of the rule base from memory 702 or the data structures from memory 708. If the data structures are not readily available, the information contained in the data structures need to be obtained from the rule base by the first mechanism 704. Otherwise, the rule sets relating to the data packet can be determined by finding the rule sets corresponding to the parameter field values of the data packet in said data structures.

The fourth mechanism 712 may compute an intersection algorithm table containing all possible rule sets or a plurality of such tables containing different combinations of rule sets on the basis of the data structures in memory 708 and the rule base in memory 702, and store resulting table(s) in memory 714. Alternatively the fourth mechanism 712 may compute an intersection algorithm table relating to a specific data packet on the basis of the rule sets relating to the data packet (received from the first mechanism 704) and on the basis of the rule base in memory 702. Such table relating to a specific data packet is then used by the second mechanism 710 for finding the smallest element in the intersection of the rule sets relating to the data packet and thus the matching rule. Alternatively, the second mechanism 710 may find the smallest element on the basis of the rule sets relating to the data packet (received from the first mechanism 704) and the tables in memory 714. If there is one table containing all rule sets in memory 714, the second mechanism 710 chooses to process in the table only the columns indicated by the rule sets relating to the data packet. And if there are tables for different combinations of rule sets, the second mechanism 710 may find the smallest element for the different combinations beforehand and have the corresponding result readily available when the rule sets relating to the data packet are received from the first mechanism 704.

Yet another option is that the fourth mechanism 712 computes the bit sequences for different rule sets and the bit sequences are used for finding the smallest element. Possibly also result sequence(s) for different combinations of rule sets may be computed and stored beforehand.

The block diagram of a network element presented here gives just examples of the implementation of the invention and is not meant to be restrictive. It is clear that the structure of the network element in accordance with the invention may vary; for example in some implementations all blocks presented herein may not be needed.

In the following the invention is explained in connection with mathematical presentation. Furthermore, a simplified example is discussed.

A rule base is a list of rules: $B=(R_1, R_2, \ldots R_m)$. Each rule can be seen as an n-tuple of sets: $R_i=<S_i(1), S_i(2), \ldots, S_i(n)>$. The sets $S_i(j)$ are subsets of containing sets: $S_i(j) \subseteq C_j$, where each $C_j$ is an ordered set. The difference between "high level rules" and "low level rules" lies in the way the sets can be defined: high level rules have more advanced operators (for example continuous ranges, set operators) to build up the sets, while low level rules require that the elements are explicitly listed, in one or more rules. Now an object (a data packet) $o=<e_1, e_2, \ldots, e_n>$ matches the rule $R_i$ if and only if $e_j \epsilon S_i(j)$ for all $1 \leq j \leq n$. We say that an element $e_j$ can match the rule $R_i$ if $e_j \epsilon S_i(j)$.

According to an embodiment of the invention partitions are computed for each containing set $C_i$ so that for each two elements in the same partition, the elements can match exactly the same rules. This gives a mapping from partitions to sets of rules. This mapping is computed on the basis of the rule base and stored in the memory. Now, when a data packet (or object) is matched to the rule base, we simply look at the partitions to which the parameter field values of the data packet belong, and use a separate method to find the smallest element in the intersection of the corresponding subsets of rules (rule sets).

The partitioning exploits the mechanisms that are used to define the sets (parameter field values) in each rule. For example the following operators may be used to define the sets $S_i$ (j): host (single element of the containing set), range (continuous range of elements), network (continuous range of elements), group (list of elements). The sets defined by these concepts can be combined in a nested way with the standard set operators: $\cup, \cap, \neg$ (union, intersection, difference).

Each containing set $C_j$ is partitioned as follows. The single elements (hosts and groups) that are used in defining the sets $S_i(j)$ are listed. In another list the continuous ranges (ranges and networks) used in defining the sets are stored. Now there are two possibilities:

1) no continuous ranges were found: there are many partitions consisting of a single element and one (large) partition that contains the rest of the elements. The elements and vectors of the rule sets that the element can match are stored in a simple hash table. When matching an object, we look for the element in the hash table. If the element is found, the corresponding rule set is stored with it. If the element is not found, it corresponds to the partition that contains the rest of the elements, and the corresponding rule set is stored separately. This case does not require that the containing sets are ordered.

2) there were some continuous ranges: now we will partition the containing set $C_i$ so that given any single partition, every two elements of the partition can match exactly the same rules, and that every partition is a continuous range. Note that by definition, the partitions do not overlap, and the union of the partitions is the containing set $C_i$. The partitions can be constructed efficiently for example in the following way (however some other way may be suitable as well). First we form a set (using standard data structures and algorithms such as red-black-trees or similar) such that a) initially the set is empty b) for each continuous range from a to b, we add values to the set as follows:

a−1, if a−1 is not yet present in the set and a−1 $\geq$ min $(C_i)$ b, if b is not yet present in the set c) for each single element a, we add values to the set as follows:

a−1, if a−1 is not yet present in the set and a−1 $\geq$ min $(C_i)$ a, if a is not yet present in the set If the set does not contain max($C_i$), it is also added to the set. The set is then sorted and traversed once to form the partitions. Assume that the C programming language vector points contains the elements of the set sorted from smallest to largest, the variable minValue is equal to min($C_i$), and that the variable numPoints contains the number of elements in the vector. Then the following C program segment stores the partitions (using the function storePartition(a, b) to store a partition represented as a continuous range from a to b, including endpoints):

```
prevPoint = minValue;
for(i = 0; i < numPoints; ++i) {
        storePartition(prevPoint, points[i]);
        prevPoint = points[i]+ 1;
}
```

Additional checks may be added to see if successive partitions can be combined into larger partitions to reduce the total number of partitions. The constructed partitions have the property that for every possible set constructed by standard set operations from the original continuous ranges and single elements in the two lists mentioned above, every two elements in a single partition either both belong to the set, or neither of them belongs to the set. For each partition is constructed a rule set that contains the indices of the rules that can match the elements of the partition. This is possible, if the set operations used cannot divide the constructed partitions any further (standard set operations union, intersection, and difference cannot divide the divided partitions any further). All of this can be done efficiently even when the rule base is large. When matching an object, the partition where the element belongs to is searched for, for example by binary search (the search can be optimized in various ways). It should be appreciated that if each (except one) partition is small, the elements in each small partition can be enumerated and handled as in case 1 above, because it will be slightly faster in the matching stage.

When the rule sets relating to a data packet have been found, a method for finding the smallest element in the intersection of given finite sets is applied to the rule sets. The intersection algorithm gives the first matching rule of the rule base. If further matches are needed, the intersection algorithm may be run again, starting from the rule after the previous match (for example a CONTINUE action in firewalls), or from a given rule (for example a JUMP action in firewalls).

In the following, a simplified example is discussed.

Table 1 shows a simple rule base comprising four rules Rule1, Rule2, Rule3 and Rule4. The rules have two parameter fields Field1 and Field2. The action field of the rules is not shown here, since it is not relevant considering this example. The parameter field values are presented as integer values for the sake of clarity, but it must be appreciated that the parameter field values may be any suitable characteristics of a data packet. In Rule1, Field1 is 1 and Field2 is 2. Let a data packet be denoted as (Field1, Field2). Then, a data packet (1, 2) matches the Rule1. In Rule2, Field1 is 1, 2 or 3 and Field2 is a range from 1 to 7, excluding 5. In Rule3, Field1 is 4 or 5 and Field2 is a range from 1 to 10. And in Rule4, Field1 is ANY and Field2 is ANY, that is, irrespective of the parameter field values of a data packet any data packet matches this rule. In other words, any data packet that does not match any of the rules Rule1, Rule2 or Rule3, matches the Rule4.

TABLE 1

Rule base

|  | Field1 | Field2 |
|---|---|---|
| Rule1 | 1 | 2 |
| Rule2 | 1, 2, 3 | 1...7 ~5 |
| Rule3 | 4, 5 | 1...10 |
| Rule4 | ANY | ANY |

Next, the rule sets for the parameter field values of the rules are determined. There are no continuous ranges in Field1 in any of the rules, except for the (ANY, ANY) rule, and therefore the values of the Field1 can be processed one by one. Rule sets for the values of Field1 are shown in Table 2. If the value in Field1 of a data packet is 1, the data packet can match rules Rule1, Rule2 and Rule4. Therefore, the rule set corresponding to the parameter field value 1 is {1, 2, 4}. Other values are processed in the same way. When the rule set for the value 3 is determined, it is noted that the resulting rule set is already stored in connection with the value 2, and therefore only reference to the rule set may be stored.

TABLE 2

Rule sets for the values of Field1

| Field1 value | Rule set |
|---|---|
| 1 | → {1, 2, 4} |
| 2 | → {2, 4} |
| 3 |  |
| 4 | → {3, 4} |
| 5 |  |
| OTHER | → {4} |

In the Field2 values there are continuous ranges, and therefore partitions need to be determined for the Field2 values before determining the rule sets. The startpoints and endpoints of the partitions are {0, 1, 2, 3, 4, 5, 6, 7, 8, 10, 11, 655351}. (If the length of the field is considered to be 2 octets (16 bits), the start and end points of the whole value range ("ANY") are 0 and 65535, respectively.) The corresponding rule sets are shown in Table 3.

TABLE 3

Rule sets for the values of Field2

| Index | Partition (value range) | Rule set |
|---|---|---|
| 1 | 0 | → {4} |
| 2 | 1 | → {2, 3, 4} |
| 3 | 2 | → {1, 2, 3, 4} |
| 4 | 3...4 |  |
| 5 | 5 | → {3, 4} |
| 6 | 6...7 |  |
| 7 | 8...10 |  |
| 8 | 11...65 535 |  |

In the following is presented one possible way to find the smallest element the intersection of finite sets.

Let $s_1, s_2, \ldots, s_n$ be subsets of a finite set $A_m = \{1, 2, \ldots, m\}$. Now we are given a of indices $I \subseteq \{1, 2, \ldots, n\}$ and the objective is to find the smallest element in $$\bigcap_{i \in I} s_i.$$

Usually in practical applications it is not possible to store all the combinations in the memory.

Let us define a function $$f(s, k) = \min(\{x | x \in s \land x \geq k\} \cup \{\infty\}).$$

This function is the key element of the intersection algorithm. Note that the values of this function can be easily tabulated for all $s_1, s_2, \ldots, s_n$ and for all $k \in \{1, 2, \ldots, m\}$, provided that the parameters are not too large. In C syntax, let the table element f[i−1][k−1] be equal to f($s_i$, k)−1 . Now f[i−1] is a vector characteristic the subset $s_i$. For efficiency and convenience, we have f[i−1][k−1]==k, if f($s_i$, k ∞), and always f[i−1][k]==k.

When given a set I of t subset indices, pointers to the characteristic vectors of these subsets are taken, let these be g[0], g[1], . . . , g[t−1]. The following C-code segment finds the first element of the intersection of these subsets:

```
sameLevelCount = 0;
subset = 0;
level = 0;
while(sameLevelCount < t) {
    if(g[subset][level] != level) {
        level =g[subset][level];
        sameLevelCount = 1;
    }
    else ++sameLevelCount;
    subset = (subset + 1) % t;
}
```

The idea of the algorithm is the following: assuming that none of the first level elements do not belong to the intersection, what is the next possible element according to subset subset? This question is answered rapidly by the beforehand computed tables. This way, level is updated until no subset changes it, and the first element in the intersection has been found.

At the end of the while loop the level variable contains the smallest element −1 in the intersection, or k, if the intersection is empty. The level variable can be incremented and the segment run again to find the next element in the intersection, and so on.

This algorithm works especially well, when at least one of the subsets is small compared to the set $A_m$. The algorithm has only a small overhead compared to the trivial algorithm, which checks all possible elements linearly, one by one. It is the inventor's opinion that the proposed algorithm works significantly faster than the trivial algorithm, when used in subset structures stemming from typical (large) firewall rule bases.

Efficient implementation of the intersection algorithm requires that the rule sets (the columns of the table) used by the intersection algorithm are computed beforehand; it is straight forward when the rule sets are known. Even tables for different combinations of rule sets and further the smallest element for different combinations of rule sets may be computed beforehand, but in many practical applications the number of different combinations is too large for this to be feasible.

In the C-code segment above the process goes cyclically through all the subsets, until no changes are made to level. It is possible to optimize the algorithm by using different heuristics to select the next subset (for example try to use smaller subsets first). These heuristics can depend for example on the level variable, using some information from the application that generated the subsets.

In table 4, an intersection algorithm table described above is shown for the example case discussed above.

TABLE 4

Intersection algorithm table

| s\k | {1, 2, 4} | {2, 4} | {3, 4} | {4} | {2, 3, 4} | {1, 2, 3, 4} |
|---|---|---|---|---|---|---|
| 1 | 1 | 2 | 3 | 4 | 2 | 1 |
| 2 | 2 | 2 | 3 | 4 | 2 | 2 |
| 3 | 4 | 4 | 3 | 4 | 3 | 3 |
| 4 | 4 | 4 | 4 | 4 | 4 | 4 |
| 5 | 5 | 5 | 5 | 5 | 5 | 5 |

Now consider for example a data packet (1, 4). From Table 2 it is seen that rule set {1, 2, 4} corresponds value 1 in Field1, that is, rules 1, 2 and 4 can match the data packet. From Table 3 it is seen that rule set (2, 3, 4) corresponds value 4 in Field2, that is, rules 2, 3 and 4 can match the data packet. Therefore, the columns corresponding to these rule sets in Table 4 are considered when the data packet (1, 4) is processed. Then the smallest element in the intersection of these rule sets is found. This means that the first row where the numbers are equal in both columns is found. The number of this row (or the number in this row) indicates the number of the rule that is applied to the data packet.

The algorithm proceeds as follows: the first row in the column {1, 2, 4} is analysed first and value 1 is found. Since this value corresponds to the number of the row, the same row in the next relevant column (i.e. column {2, 3, 4}) is analysed. There, value 2 is found. Due to this the algorithm proceeds to the row 2 in column {1, 2, 4}, that is, to the row indicated by the previously found number, and the value 2 is found. It is implicitly known that the column {2, 3, 4} includes number 2 on the row 2 (otherwise the algorithm would not have jumped to this row). Therefore there is no need to jump to the row 2 in the same column. Since the value in the column {1, 2, 4} equals to the row number (and the value in column {2, 3, 4} is already known to equal the row number), the algorithm concludes that the same value has been found in the same row of all relevant columns. (If there were more than two relevant columns, the algorithm would have jumped to the next column on the same row.) Thus, the rule to be applied is the rule number 2 (Rule2).

The advantage of the invention is that it optimizes the rule base traversal in a firewall (or similar network element) so that the performance of the firewall improves especially with very large rule bases. The method is fast because the rules are not matched linearly; the method can directly skip a number of successive rules whenever they cannot match to a parameter field value in the data packet. Furthermore, there is no need to translate the high level rules into low level rules, which is important, if there are complex expressions defining the sets in the rules. Computational cost before the method according to the second aspect of the invention comprises of one data structure search, which may be a hash table search (almost constant time) or a partition search (at most logarithmic time), for each parameter field value of the matched data packet. When the method according to the invention is used, complex expressions can be used in all parameter fields of the rules without significant decrease in performance. Also the possibility to compute the necessary data structures and tables beforehand solely on the basis of the rule base (before matching data packets to rules and before knowing the parameter field values of the data packets) improves the processing speed. Nevertheless, it must be noted that in some applications computing and storing beforehand all possible combinations for the rule set tables may not be feasible and/or necessary.

It will be apparent for those skilled in the art that the illustrative embodiments described are only examples and that various modifications can be made within the scope of the invention as defined in the appended claims.

The invention claimed is:

1. A method for finding, in a rule base, a rule matching a data packet, a data packet comprising parameter fields for identifying the data packet, the rule base comprising a plurality of sequentially labeled rules, each rule comprising one or more parameter fields, and a rule matching a data packet being a rule, whose parameter field values correspond to the parameter field values of said data packet, and the method comprising:

determining rule sets for the data packet, one rule set comprising the rules to which one parameter field value of the data packet can match, finding the rule with the smallest label that is present in all said rule sets of the data packet, said rule with the smallest label indicating the rule matching the data packet, said finding further comprising:

computing a table for the combination of the rule sets of the data packet, the rows of the table corresponding to the labels of the rules in the rule base, and the columns of the table corresponding to the different rule sets, and the cells of the table being filled so that each cell contains an element, which is the smallest possible label of a rule of the respective rule set and equal to or larger than the label of the respective row, observing a first element in a first row of a first column and comparing the first element to the respective row label, if the element is equal to the row label, jumping to another column in the same row and observing a second element found therein, or otherwise jumping to the row indicated by the first element and observing a second element found in a column therein, and proceeding on the basis of the second element and the respective row label in the same way as with the first element, and repeating the steps of observing, comparing and jumping until a row containing equal elements in all columns or the last row of the table is found, the label of said row or said equal element indicating the rule matching the data packet; and passing the data packet forward or dropping the data packet based on an action defined in the matching rule.

2. A method according to claim 1, wherein, in a rule set, the rules following said rule matching the data packet form a remainder of said rule set, and said method further comprises:

finding the rule with the smallest label that is present in said remainders of all rule sets of the data packet, said further smallest element indicating a further rule matching the data packet.

3. A method according to claim 1, wherein said determining further comprises:

computing, for each parameter field in the rule base, a data structure indicating different valus or value ranges of the parameter field and, for each different value or value range, said one rule set of the rules, to which said value or value range can match, and storing said data structures.

4. A method according to claim 3, wherein computing a data structure comprises:

computing, for a parameter field, said rule set for each value or value range defined in the rules of the rule base, and computing a further rule set for the values of said parameter field, which are not included in the values or value ranges defined in the rules of the rule base.

5. A method according to claim 3, wherein, if two or more values or value ranges of the parameter fields in a rule base result in the same rule set, the rule set is srored in a data structure in connection with a first occurrence os said rule set, and in connection with a second occurrence of the rule set, a reference to said stored rule set is stored.

6. A method according to claim 3, wherein the rules following said rule matching the data packet in a rule set form a remainder of said rule set, and said method further comprises:

finding the rule with the smallest label that is present in said remainders of all rule sets of the data packet, said further smallest element indicating a further rule matching the data packet.

7. A network element comprising functionality for finding, in a rule base, a rule matching a data packet, a data packet comprising parameter fields for identifying the data packet, the network element comprising memory for the rule base, the rule base comprising a plurality of sequentially labeled rules, each rule comprising one or more parameter fields, and a rule matching a data packet being a rule, whose parameter field values correspond to the parameter field values of said data packet, and said network element comprising:

a first mechanism for determining rule sets for the data packet, one rule set comprising the rules to which one parameter field value of the data packet can match, a second mechanism for finding the rule with the smallest label that is present in all said rule sets of the data packet, said rule with the smallest label indicating the rule matching the data packet, a mechanism for passing the data packet forward or dropping the data packet based on an action defined in the matching rule, a fourth mechanism for computing a table for the combination of the rule sets of the data packet, the rows of the table corresponding to the labels of the rules in the rule base, and the columns of the table corresponding to the different rule sets, and the cells of the table being filled so that each cell contains an element, which is the smallest possible label of a rule of the respective rule set and equal to or larger than the label of the respective row, and said second mechanism comprising a mechanism for observing a first element in a first row of a first column and comparing the first element to the respective row label, which second mechanism is adapted if the element is equal to the row label, to jump to another column in the same row and to observe a second element found therein, or otherwise to jump to the row indicated by the first element and to observe a second element found in a column therein, and to proceed on the basis of the second element and the respective row label in the same way as with the first element, and wherein the second mechanism is further adapted to repeat the steps of observing, comparing and jumping until a row containing equal element in all columns or the last row of the table is found, the label of said row or said equal element indicating the rule matching the data packet.

8. A network element according to claim 7, comprising:

a fourth mechanism for computing, for each parameter field in the rule base, a data structure indicating different values or value ranges of the parameter field and, for each different value or value range, a rule set of the rules, to which said value or value range can match, memory for storing said data structures, and said first mechanism comprising a mechanism for finding in said data structures rule sets for the data packet, said rule sets being the rule sets corresponding to the parameter field values of the data packet.

9. A computer program product containing computer program code for finding, in a rule base, a rule matching a data packet, a data packet comprising parameter fields for identifying the data packet, the rule base comprising a plurality of sequentially labeled rules, each rule comprising one or more parameter fields, and a rule matching a data packet being a rule, whose parameter field values correspond to the parameter field values of said data packet, and wherein executing said computer program code in a computer causes the computer to execute the steps of:

determining rule sets for the data packet, one rule set comprising the rules to which one parameter field value of the data packet can match, finding the rule with the smallest label that is present in all said rule sets of the data packet, said rule with the smallest label indicating the rule matching the data packet, passing the data packet forward or dropping the data packet based on an action defined in the matching rule, computing a table for the combination of the rule sets of the data packet, the rows of the table corresponding to the labels of the rules in the rule base, and the columns of the table corresponding to the different rule sets, and the cells of the table being filled so that each cell contains an element, which is the smallest possible label of a rule of the respective rule set and equal to or larger than the label of the respective row, observing a first element in a first row of a first column and comparing the first element to the respective row label, if the element is equal to the row label, jumping to another column in the same row and observing a second element found therein, or otherwise jumping to the row indicated by the first element and observing a second element found in a column therein, proceeding on the basis of the second element and the respective row label in the same way as with the first element, and repeating the steps of observing, comparing and jumping until a row containing equal elements in all columns or the last row of the table is found, the label of said row or said equal element indicating the rule matching the data packet.

10. A computer program product according to claim 9, wherein executing said computer program code in a computer causes the computer to execute the steps of:

computing, for each parameter field in the rule base, a data structure indicating different values or value ranges of the parameter field and, for each different value or value range, said one rule set of the rules, to which said value or value range can match, and storing said data structures.

* * * * *

UNITED STATES PATENT AND TRADEMARK OFFICE
CERTIFICATE OF CORRECTION

PATENT NO. : 7,386,525 B2 Page 1 of 1
APPLICATION NO. : 09/957516
DATED : June 10, 2008
INVENTOR(S) : Nurmela et al.

It is certified that error appears in the above-identified patent and that said Letters Patent is hereby corrected as shown below:

On the title page item (73), should read --Stonesoft Corporation, Helsinki (FI)--.

Signed and Sealed this

Twenty-fourth Day of February, 2009

JOHN DOLL
*Acting Director of the United States Patent and Trademark Office*